United States Patent
Pankey

(10) Patent No.: US 10,550,553 B1
(45) Date of Patent: Feb. 4, 2020

(54) ADJUSTABLE HANDLE DEVICE FOR USE WITH A VALVE STEM

(71) Applicant: Donzino Pankey, Charlotte, NC (US)

(72) Inventor: Donzino Pankey, Charlotte, NC (US)

( * ) Notice: Subject to any disclaimer, the term of this patent is extended or adjusted under 35 U.S.C. 154(b) by 0 days.

(21) Appl. No.: 16/404,832

(22) Filed: May 7, 2019

Related U.S. Application Data

(63) Continuation-in-part of application No. 15/676,990, filed on Aug. 14, 2017, now abandoned.

(51) Int. Cl.
*F16K 31/60* (2006.01)
*E03C 1/04* (2006.01)

(52) U.S. Cl.
CPC ............ *E03C 1/0412* (2013.01); *F16K 31/60* (2013.01); *Y10T 137/6024* (2015.04)

(58) Field of Classification Search
CPC .......... E03C 1/0412; E03C 1/04; F16K 31/60; F16K 31/602; F16K 31/605; F16K 31/607; Y10T 137/6014; Y10T 137/6024; Y10T 137/9464
USPC ...................... 251/291, 292; 279/60–65, 902
See application file for complete search history.

(56) References Cited

U.S. PATENT DOCUMENTS

| | | | | |
|---|---|---|---|---|
| 1,343,086 A | * | 6/1920 | Neil ................................ | 279/60 |
| 1,391,012 A | * | 9/1921 | Schulder ................. | F16K 31/60 403/359.5 |
| 1,542,070 A | * | 6/1925 | McKee ................... | F16K 31/60 403/261 |
| 1,741,588 A | * | 12/1929 | Schneider ............... | F16K 31/60 403/255 |
| 1,800,981 A | * | 4/1931 | Beste ....................... | F16K 31/60 403/290 |
| 1,878,569 A | * | 9/1932 | Zolleis .................... | F16K 31/60 74/548 |
| 1,989,083 A | * | 1/1935 | Dahnken ................. | F16K 31/60 403/288 |
| 2,023,951 A | * | 12/1935 | Cohan ..................... | F16K 31/60 74/548 |
| 2,039,917 A | * | 5/1936 | Michel .................... | F16K 31/60 403/202 |
| 2,305,099 A | * | 12/1942 | Morris .................... | F16K 31/60 403/7 |
| 2,307,392 A | * | 1/1943 | Crane ..................... | F16K 31/60 74/553 |
| 2,463,066 A | * | 3/1949 | Stuvel .................... | F16K 31/60 403/362 |

(Continued)

FOREIGN PATENT DOCUMENTS

WO 2010068421 6/2010

*Primary Examiner* — Reinaldo Sanchez-Medina
*Assistant Examiner* — David Colon-Morales

(57) ABSTRACT

The adjustable handle device for use with a valve stem comprises a body, a cap, a plurality of jaws, and a handle. The device may couple to a valve stem of a faucet in place of a valve handle that is missing or broken. The plurality of jaws located within the body may be raised and lowered by rotating the cap relative to the body. A jaw thread on the plurality of jaws may engage a cap thread on the interior of the cap to cause movement of the jaws. The jaws may be included by a jaw inclination angle such that raising or lowering the jaws may cause the lower ends of the jaws to separate or to converge. Convergence of the lower ends of the jaws may allow the jaws to grip a valve stem. A handle may cover the cap to enhance the user's grasp.

14 Claims, 6 Drawing Sheets

(56) References Cited

U.S. PATENT DOCUMENTS

| | | | | |
|---|---|---|---|---|
| 2,587,862 | A * | 3/1952 | Krucki | F16K 31/60 403/253 |
| 2,684,856 | A * | 7/1954 | Stoner | B23B 31/1238 279/61 |
| 2,685,466 | A * | 8/1954 | Middleton | F16K 31/602 74/548 |
| 2,698,956 | A * | 1/1955 | Thompson | A47J 45/074 220/759 |
| 2,761,713 | A * | 9/1956 | Schulze | F16K 31/60 403/279 |
| 2,797,941 | A * | 7/1957 | Manning | F16K 31/60 403/350 |
| 3,241,869 | A * | 3/1966 | Bowers | F16K 31/60 403/257 |
| 3,243,210 | A * | 3/1966 | Manning | F16K 31/60 403/7 |
| 4,176,674 | A | 12/1979 | Rodriguez | |
| 4,260,169 | A * | 4/1981 | Hall | B23B 31/1238 279/62 |
| 4,423,881 | A * | 1/1984 | Whitehead | B23B 31/1238 279/60 |
| 4,648,608 | A * | 3/1987 | Smith | B23B 31/1253 279/60 |
| 5,025,826 | A * | 6/1991 | Schoepe | F16K 31/60 137/315.15 |
| 5,195,760 | A * | 3/1993 | Wheeler | B23B 31/1253 279/60 |
| 5,337,450 | A * | 8/1994 | Martin | E05B 3/04 16/422 |
| 5,810,504 | A | 9/1998 | Rabinovich | |
| 6,260,857 | B1 * | 7/2001 | Wienhold | B23B 31/1238 279/140 |
| 6,341,783 | B1 * | 1/2002 | Rohm | B23B 31/123 279/140 |
| 6,363,579 | B1 * | 4/2002 | King, Jr. | F16K 31/607 16/430 |
| 7,316,404 | B1 * | 1/2008 | Walker | B23B 31/123 279/60 |
| 7,331,358 | B2 | 2/2008 | Gallina et al. | |
| D631,003 | S | 1/2011 | Stover et al. | |
| 8,402,991 | B2 | 3/2013 | Wu | |
| 8,832,905 | B2 * | 9/2014 | Huang | F16K 31/60 137/315.15 |
| 9,334,636 | B1 * | 5/2016 | Finegan, Jr. | E03C 1/0412 |
| 2003/0178795 | A1 * | 9/2003 | Corcoran | B23B 31/1238 279/62 |
| 2009/0265891 | A1 * | 10/2009 | Pett | F16B 35/06 16/430 |
| 2011/0180155 | A1 | 7/2011 | Shantzis | |
| 2012/0241654 | A1 * | 9/2012 | Clifford | F16K 31/60 251/96 |
| 2015/0251252 | A1 * | 9/2015 | Schenk | B21H 7/14 279/62 |

\* cited by examiner

ADJUSTABLE HANDLE DEVICE FOR USE WITH A VALVE STEM

CROSS REFERENCES TO RELATED APPLICATIONS

This application is a continuation-in-part of U.S. application Ser. No. 15/676,990, filed Aug. 14, 2017.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of plumbing, more specifically, an adjustable handle device for use with a valve stem.

SUMMARY OF INVENTION

The adjustable handle device for use with a valve stem comprises a body, a cap, a plurality of jaws, and a handle. The device may couple to a valve stem of a faucet in place of a valve handle that is missing or broken. The plurality of jaws located within the body may be raised and lowered by rotating the cap relative to the body. A jaw thread on the plurality of jaws may engage a cap thread on the interior of the cap to cause movement of the jaws. The jaws may be included by a jaw inclination angle such that raising or lowering the jaws may cause the lower ends of the jaws to separate or to converge. Convergence of the lower ends of the jaws may allow the jaws to grip a valve stem. A handle may cover the cap to enhance the user's grasp.

An object of the invention is to attach to a valve stem as a replacement handle for a faucet.

Another object of the invention is to provide a plurality of inclined jaws that may be separated or converged at their lower ends to release or grasp the valve stem.

A further object of the invention is to provide relief contours on the body and on the handle to enhance a user's grasp.

Yet another object of the invention is to provide threads on the plurality of jaws and on the interior surface of the cap to raise and lower the inclined jaws.

These together with additional objects, features and advantages of the adjustable handle device for use with a valve stem will be readily apparent to those of ordinary skill in the art upon reading the following detailed description of the presently preferred, but nonetheless illustrative, embodiments when taken in conjunction with the accompanying drawings.

In this respect, before explaining the current embodiments of the adjustable handle device for use with a valve stem in detail, it is to be understood that the adjustable handle device for use with a valve stem is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the adjustable handle device for use with a valve stem.

It is therefore important that the claims be regarded as including such equivalent construction insofar as they do not depart from the spirit and scope of the adjustable handle device for use with a valve stem. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
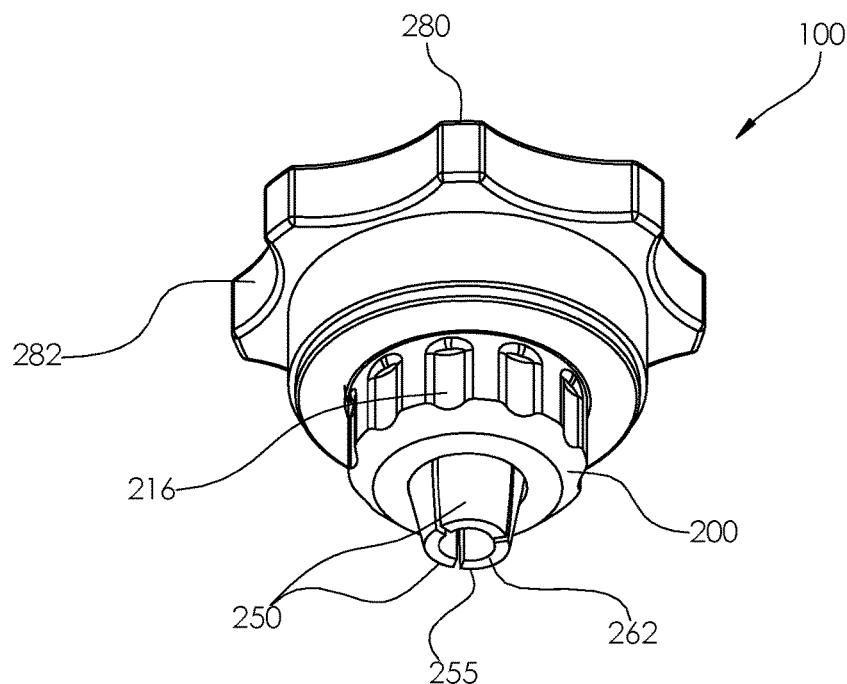
FIG. 1 is a perspective view of an embodiment of the disclosure.
Figure 2:
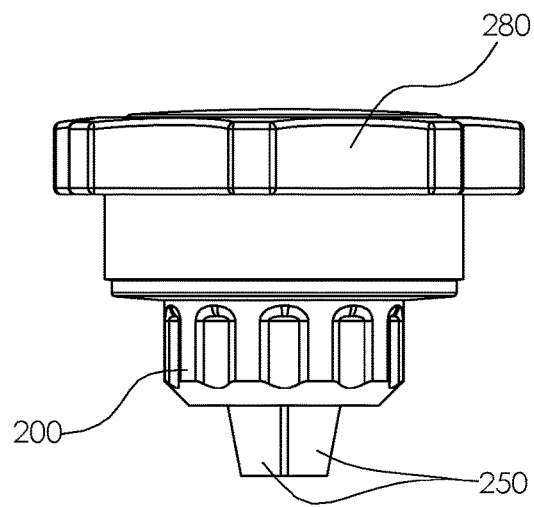
FIG. 2 is a side view of an embodiment of the disclosure illustrating the plurality of jaws in the lowered and converged position.
Figure 3:
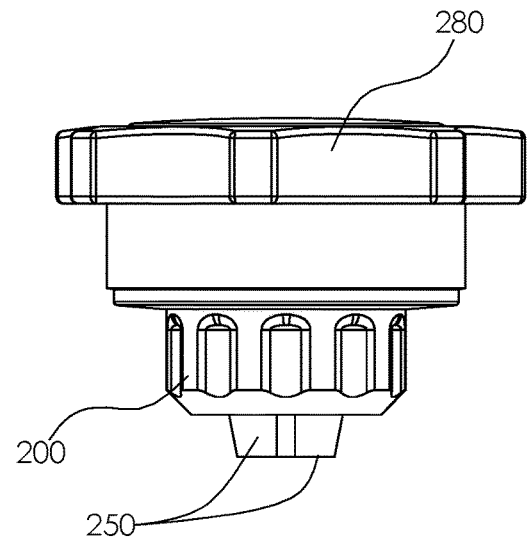
FIG. 3 is a side view of an embodiment of the disclosure illustrating the plurality of jaws in the raise and separated position.
Figure 4:
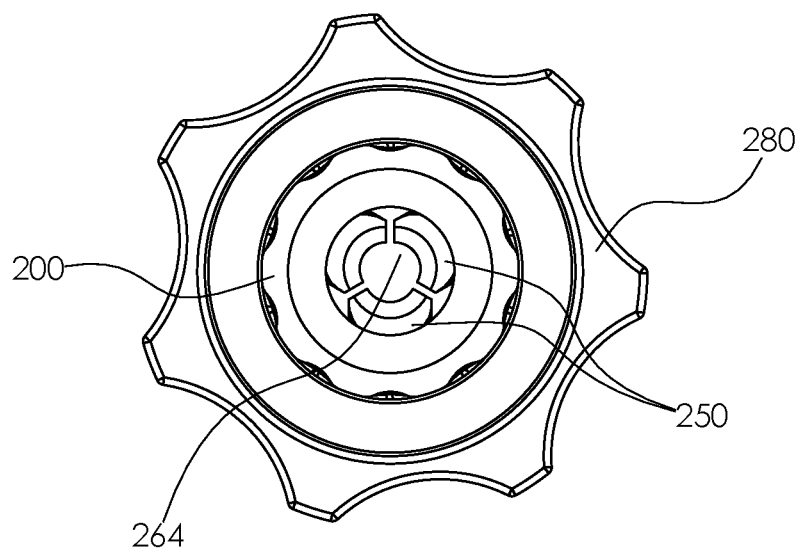
FIG. 4 is a bottom view of an embodiment of the disclosure illustrating the plurality of jaws in the lowered and converged position.
Figure 5:
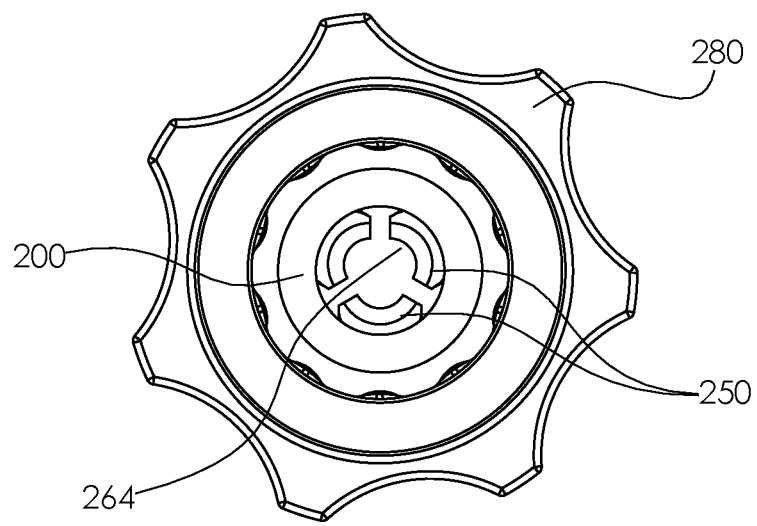
FIG. 5 is a bottom view of an embodiment of the illustrating the plurality of jaws in the raise and separated position.
Figure 6:
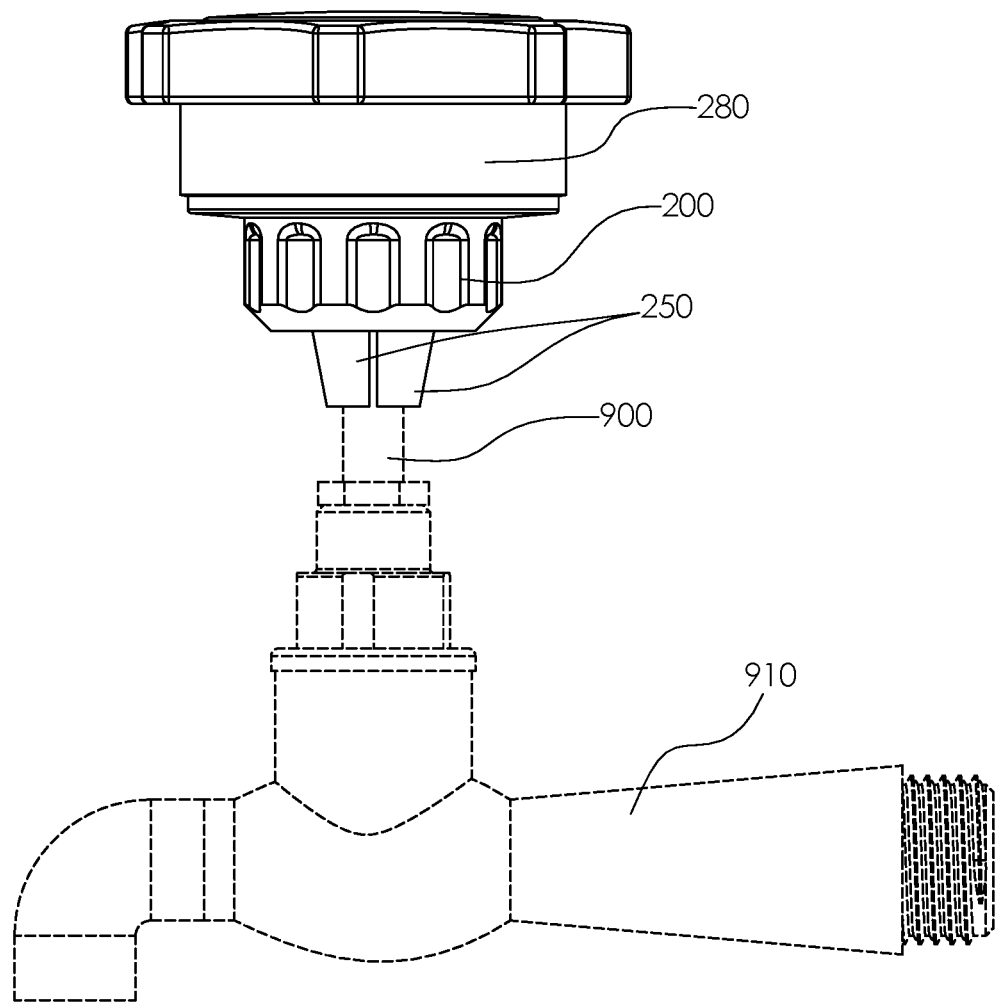
FIG. 6 is an in-use view of an embodiment of the disclosure.
Figure 7:
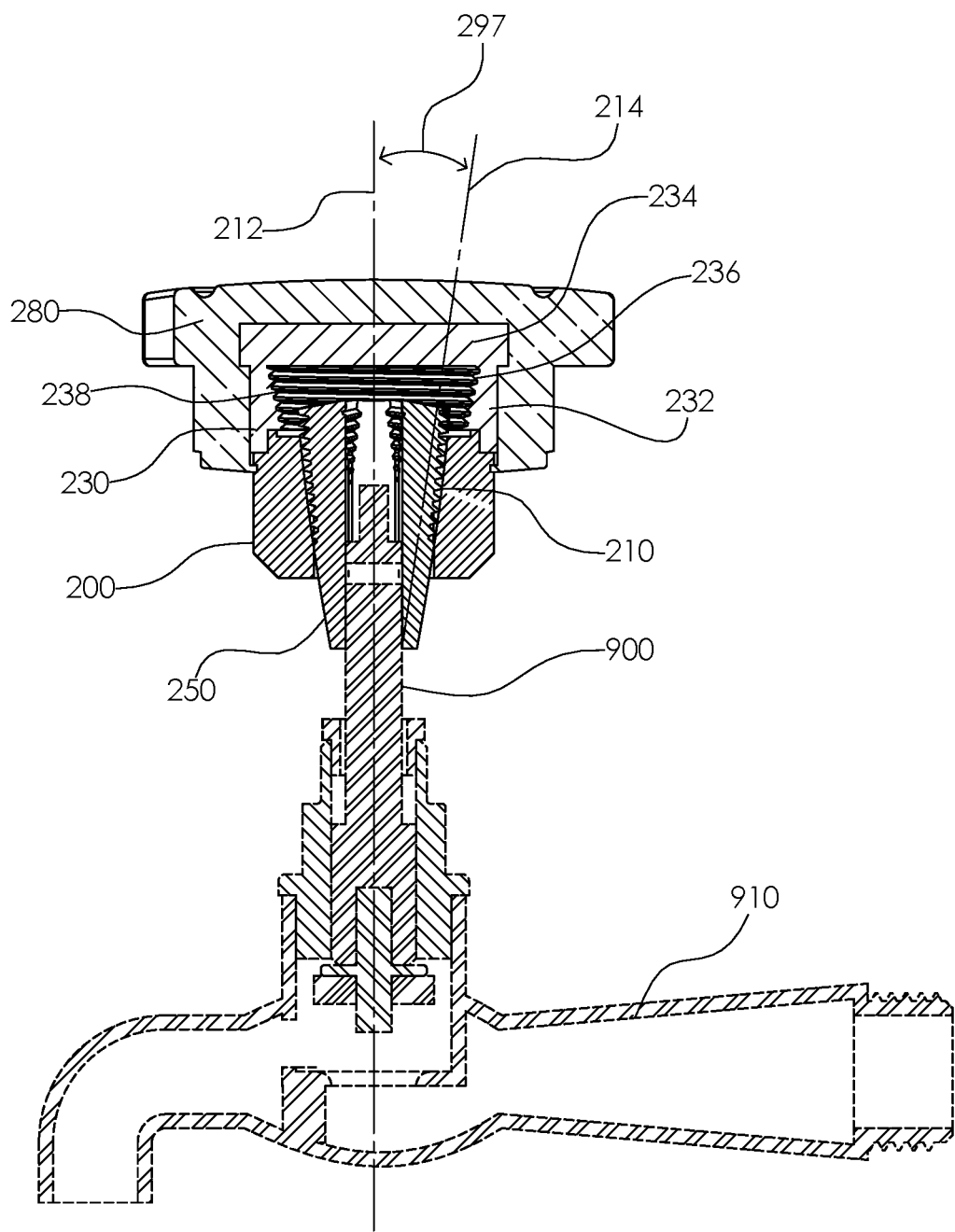
FIG. 7 is a cross-sectional view of an embodiment of the disclosure illustrating the plurality of jaws in the lowered and converged position.
Figure 8:
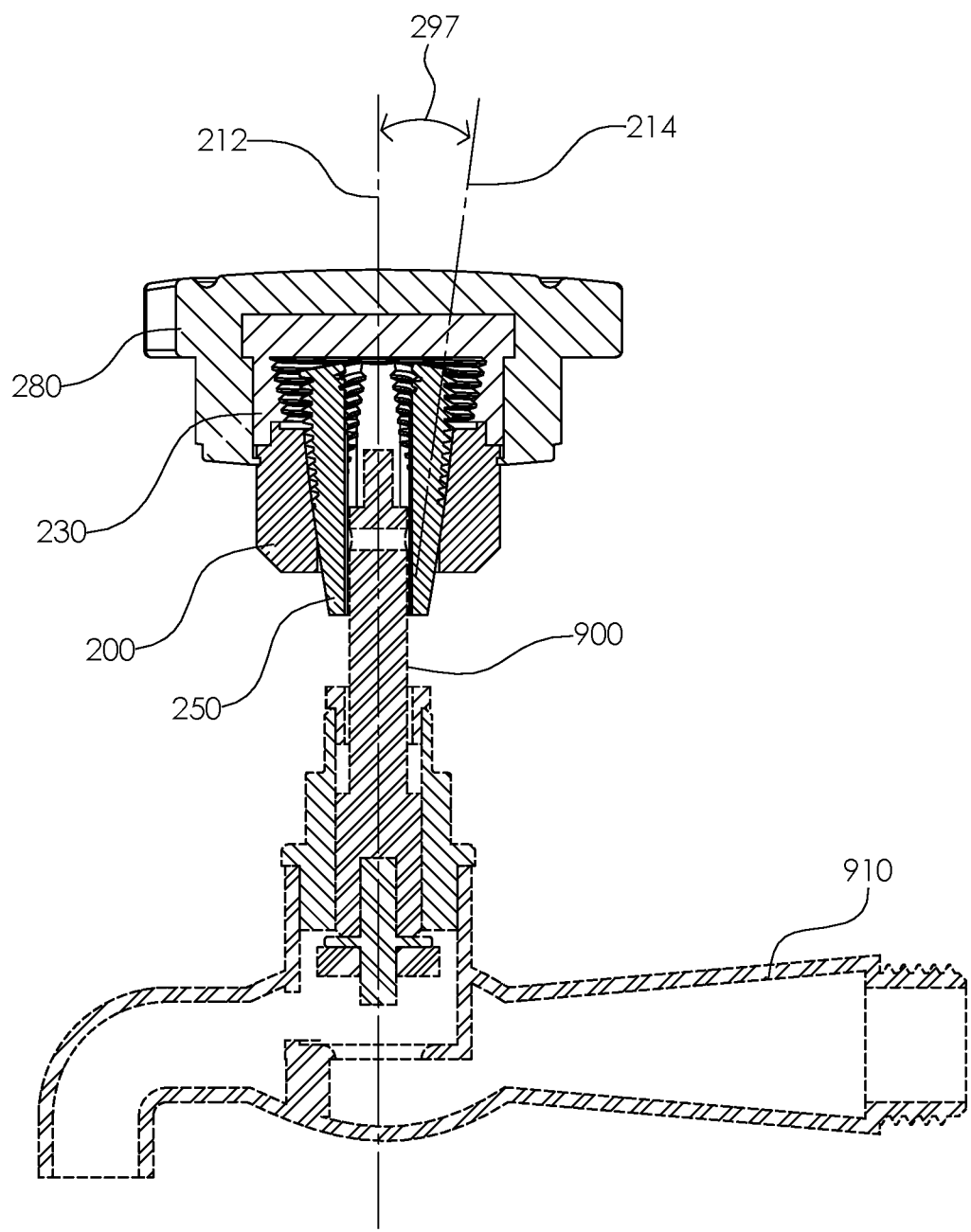
FIG. 8 is a cross-sectional view of an embodiment of the disclosure illustrating the plurality of jaws in the raise and separated position.
Figure 9:
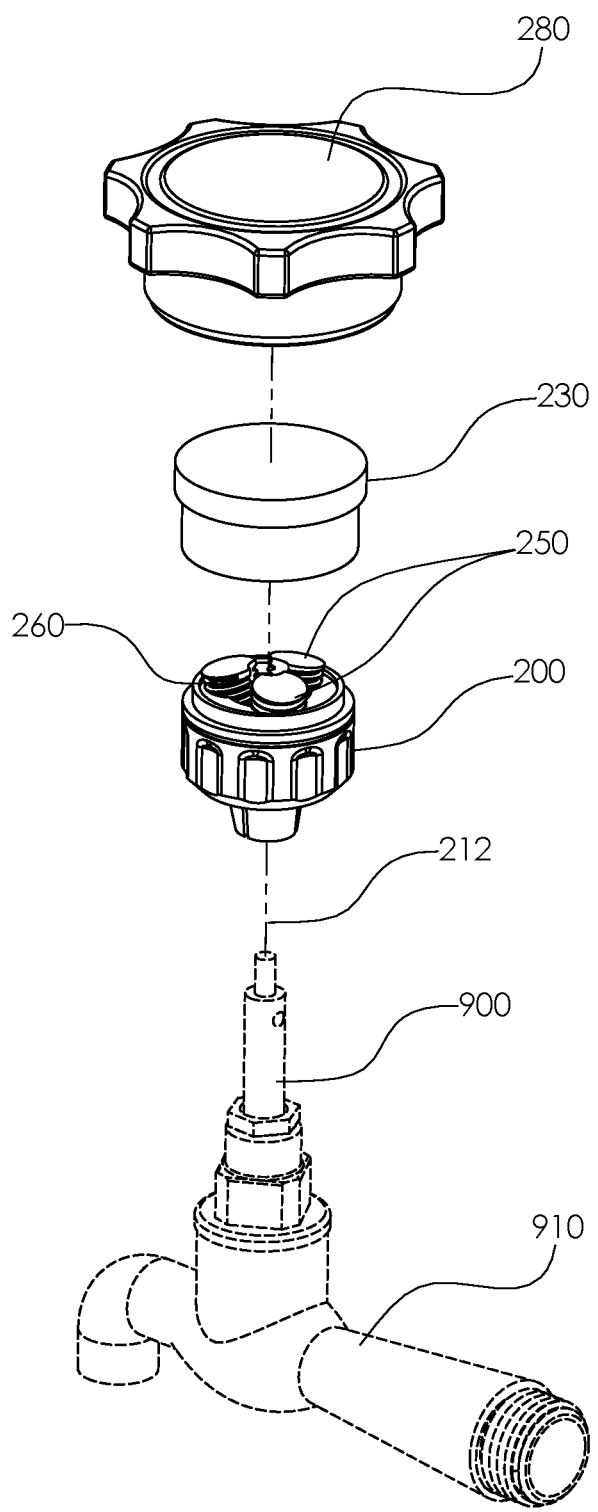
FIG. 9 is am exploded view of an embodiment of the disclosure.

Detailed reference will now be made to a first potential embodiment of the disclosure, which is illustrated in FIGS. 1 through 9.

The adjustable handle device for use with a valve stem 100 (hereinafter invention) comprises a body 200, a cap 230, a plurality of jaws 250, and a handle 280. The invention 100 may couple to a valve stem 900 of a faucet 910 in place of a valve handle that is missing or broken.

The body 200 may be a cylindrical retainer for the plurality of jaws 250 that is centered around a centerline of the valve handle 212. The body 200 may comprise a plurality of jaw apertures 210 which surround the centerline of the valve handle 212. Each individual jaw aperture 205 selected from the plurality of jaw apertures 210 may be inclined from vertical by a jaw inclination angle 297. In some embodiments, the jaw inclination angle 297 may be between 5 and 22.5 degrees. The plurality of jaw apertures 210 may be spaced around the centerline of the valve handle 212 and may be equally separated from each other radially. The plurality of jaw apertures 210 may be oriented such that centerline of the jaw aperture 214 for each of the plurality of jaw apertures 210 may intersect at a common point on the centerline of the valve handle 212 that is located below the body 200. The diameter of the individual jaw aperture 205 may be at least as large as the diameter of an individual jaw 255 such that the plurality of jaws 250 may move up and down within the plurality of jaw apertures 210.

The height of the body 200 may be less than the height of the individual jaw 255 selected from the plurality of jaws 250 such that the individual jaw 255 extends above and below the body 200.

The cap 230 may comprise a side wall 232 that is cylindrical and a planar top wall 234. The cap 230 may cover the top of the body 200. The cap 230 may extend or retract the plurality of jaws 250 when rotated differential relative to the body 200.

An interior surface of the side wall 238 may comprise a cap thread 236 that complements a jaw thread 260 found on the plurality of jaws 250. The interior surface of the side wall 238 may be angled at the jaw inclination angle 297 such that the cap thread 236 aligns with the jaw thread 260. The jaw inclination angle 297 may result in the top of the interior of the cap 230 being wider than the bottom of the interior of the cap 230.

Each of the plurality of jaws 250 may be a vertically oriented shaft that tapers at the lower end of the shaft. The top half of each of the plurality of jaws 250 may be threaded on at least a distal side of the individual jaws 255. The plurality of jaws 250 may be slidably coupled to the body 200 by passing through the plurality of jaw apertures 210. The lower half of the plurality of jaws 250 may comprise a concave contour 262 on an interior surface of the jaws 264. The plurality of jaws 250 may extend above and below the body 200.

The tops of the plurality of jaws 250 may be covered by the cap 230. The thread on the distal side of the plurality of jaws 250 may engage the thread on the interior surface of the side wall 238 of the cap 230. The cap 230 may rotate independently of the body 200. As the cap 230 rotates the threads on the interior surface of the side wall 238 may raise or lower the plurality of jaws 250.

Due to the jaw inclination angle 297, the bottoms of the plurality of jaws 250 may be confined to a smaller diameter around the centerline of the valve handle 212 than the tops of the plurality of jaws 250. When the plurality of jaws 250 are raised by rotation of the cap 230, the lower ends of the plurality of jaws 250 may lift and separate. When the plurality of jaws 250 are lowered by counter-rotation of the cap 230, the lower ends of the plurality of jaws 250 may drop and converge. If the valve stem 900 is placed between the lower ends of the plurality of jaws 250, the plurality of jaws 250 may grasp the valve stem 900 when lowered and may release the valve stem 900 when raised.

In some embodiments, there may be three of the individual jaw apertures 205 and three of the individual jaws 255. The individual jaw apertures 205 may be spaced around the body 200 120 degrees from each other.

The handle 280 may be adapted to be grasped by the user's hand to turn the faucet 910 on or off. The handle 280 may couple to the cap 230 and may increase the diameter of the cap 230.

The exterior surface of the body 200 may comprise body relief 216 to reduce slipping when the body 200 is gripped. The exterior surface of the handle 280 may comprise handle relief 282 to reduce slipping when the body 200 is gripped.

In use, the plurality of jaws 250 may be separated by grasping the body 200 with one hand, grasping the handle 280 with the other hand, and rotating the handle 280 with respect to the body 200 such that the lower end of the plurality of jaws 250 raise and separate. The invention 100 may then be placed over the top of the valve stem 900 by placing the upper end of the valve stem 900 into the space between the lower ends of the plurality of jaws 250 and lowering the invention 100 onto the valve stem 900. The plurality of jaws 250 may be tightened against the valve stem 900 by grasping the body 200 and the handle 280 and rotating the handle 280 with respect to the body 200 in the opposite direction such that the lower end of the plurality of jaws 250 lower and converge. Once the plurality of jaws 250 have been tightened, the user may grasp and rotate the handle 280 only in order to turn the faucet 910 on or off. To remove the invention 100 from the valve stem 900, the user may grasp the body 200 with one hand, grasp the handle 280 with the other hand, and rotate the handle 280 with respect to the body 200 such that the plurality of jaws 250 raise and separate.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" is an opening in a surface. Aperture may be synonymous with hole, slit, crack, gap, slot, or opening.

As used in this disclosure, an "arc" refers to a portion of a circumference or a curved perimeter. When applied to an angle, the arc also refers to a measure of an angular span as measured from a circle at the vertex formed by the sides of the angle.

As used in this disclosure, the "centerline" is an imaginary line that defines the center of one or more cross sections of an object. Unless stated otherwise, the centerline follows a longitudinal path through the object at the center of lateral cross sections. If the object is tubular, the centerline follows the center of the tube.

As used in this disclosure, "concave" is used to describe a surface that resembles the interior surface of a sphere or a portion thereof.

As used herein, the words "couple", "couples", "coupled" or "coupling", refer to connecting, either directly or indirectly, and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used in this disclosure, the terms "distal" and "proximal" may be used to describe relative positions. Distal refers to the object, or the end of an object, that is situated away from the point of origin, point of reference, or point of attachment. Proximal refers to the object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point, a central axis, or a centerline of an object and the direction of comparison may be in a radial or lateral direction.

As used in this disclosure, a "faucet" refers to a valve and a discharge pipe that draws water from a pipe or reservoir and discharges the drawn water through the discharge pipe. When the term faucet is applied to a sink, the term faucet refers to a single discharge pipe and all the valves that feed the discharge pipe.

As used in this disclosure, a "handle" is an object by which a tool, object, or door is held or manipulated with the hand.

As used in this disclosure, the term "shaft" is used to describe a rigid cylinder. A shaft is often used as the handle of a tool or implement or as the center of rotating machinery or motors. The definition of shaft explicitly includes solid shafts or shafts that comprise a hollow passage through the shaft along the center axis of the shaft cylinder, whether the shaft has one or more sealed ends or not.

As used in this disclosure, a "valve" is a device that is used to control the flow of a fluid, either gas or liquid, through a pipe or to control the flow of a fluid into and out of a container. Some valves may have multiple ports and may allow the diverting or mixing of fluids.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 9, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An adjustable handle device for use with a valve stem comprising:
    a body, a cap, a plurality of jaws, and a handle;
    wherein the adjustable handle device for use with the valve stem couples to the valve stem of a faucet in place of a valve handle that is missing or broken;
    wherein the body is a cylindrical retainer for the plurality of jaws that is centered around a centerline of the valve stem;
    wherein the body comprises a plurality of jaw apertures which surround the centerline of the valve handle;
    wherein each individual jaw aperture selected from the plurality of jaw apertures is inclined from vertical by a jaw inclination angle;
    wherein the plurality of jaw apertures are spaced around the centerline of the valve stem and are equally separated from each other radially;
    wherein the plurality of jaw apertures are oriented such that centerlines of the jaw aperture for each of the plurality of jaw aperture intersects at a common point on the centerline of the valve stem that is located below the body;
    wherein the diameter of the individual jaw aperture is at least as large as the diameter of an individual jaw such that the plurality of jaws move up and down within the plurality of jaw apertures;
    wherein the height of the body is less than the height of the individual jaw selected from the plurality of jaws such that the individual jaw extends above and below the body.

2. The adjustable handle device for use with a valve stem according to claim 1
    wherein the jaw inclination angle is between 5 and 22.5 degrees.

3. The adjustable handle device for use with a valve stem according to claim 1
    wherein the cap comprises a side wall that is cylindrical and a planar top wall;
    wherein the cap covers the top of the body;
    wherein the cap extends or retract the plurality of jaws when rotated differential relative to the body.

4. The adjustable handle device for use with a valve stem according to claim 3
    wherein an interior surface of the side wall comprises a cap thread that complements a jaw thread found on the plurality of jaws.

5. The adjustable handle device for use with a valve stem according to claim 4
    wherein the interior surface of the side wall is angled at the jaw inclination angle such that the cap thread aligns with the jaw thread;
    wherein the jaw inclination angle results in the top of the interior of the cap being wider than the bottom of the interior of the cap.

6. The adjustable handle device for use with a valve stem according to claim 5
    wherein each of the plurality of jaws are a vertically oriented shaft that tapers at the lower end of the shaft.

7. The adjustable handle device for use with a valve stem according to claim 6
    wherein the top half of each of the plurality of jaws are threaded on at least a distal side of the individual jaws.

8. The adjustable handle device for use with a valve stem according to claim 7 wherein the plurality of jaws are slidably coupled to the body by passing through the plurality of jaw apertures;

wherein the lower half of the plurality of jaws comprise a concave contour on an interior surface of the jaws.

9. The adjustable handle device for use with a valve stem according to claim 8 wherein the plurality of jaws extend above and below the body.

10. The adjustable handle device for use with a valve stem according to claim 9 wherein the tops of the plurality of jaws are covered by the cap;

wherein the thread on the distal side of the plurality of jaws engage the thread on the interior surface of the side wall of the cap;

wherein the cap rotates independently of the body;

wherein as the cap rotates the threads on the interior surface of the side wall raise or lower the plurality of jaws.

11. The adjustable handle device for use with a valve stem according to claim 10 wherein due to the jaw inclination angle, the bottoms of the plurality of jaws are confined to a smaller diameter around the centerline of the valve stem than the tops of the plurality of jaws;

wherein when the plurality of jaws are raised by rotation of the cap, the lower ends of the plurality of jaws lift and separate;

wherein when the plurality of jaws are lowered by counter-rotation of the cap, the lower ends of the plurality of jaws drop and converge;

wherein the plurality of jaws grasps the valve stem when lowered and release the valve stem when raised.

12. The adjustable handle device for use with a valve stem according to claim 11 wherein there are three of the individual jaw apertures and three of the individual jaws;

wherein the individual jaw apertures are spaced around the body 120 degrees from each other.

13. The adjustable handle device for use with a valve stem according to claim 12 wherein the handle is adapted to be grasped by user's hand to turn the faucet on or off;

wherein the handle couples to the cap and increases a diameter of the cap.

14. The adjustable handle device for use with a valve stem according to claim 12 wherein the exterior surface of the body comprises a body relief to reduce slipping when the body is gripped;

wherein the exterior surface of the handle comprises a handle relief to reduce slipping when the body is gripped.

* * * * *